United States Patent
Gallick et al.

(10) Patent No.: US 6,282,599 B1
(45) Date of Patent: *Aug. 28, 2001

(54) SYSTEM FOR PROVIDING BRIDGING OF BACKPLANE

(75) Inventors: Robert Lawrence Gallick; John Wesley Spenik, both of Phoenix, AZ (US)

(73) Assignee: AG Communication Systems Corporation, Phoenix, AZ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 63 days.

(21) Appl. No.: 09/189,184

(22) Filed: Nov. 10, 1998

Related U.S. Application Data

(60) Provisional application No. 60/101,134, filed on Sep. 21, 1998.

(51) Int. Cl.[7] .............................. G06F 13/38; G06F 13/40
(52) U.S. Cl. ......................... 710/126; 710/101; 710/128; 710/129; 710/9
(58) Field of Search ................................. 710/129, 128, 710/101, 126, 9

(56) References Cited

U.S. PATENT DOCUMENTS

| | | | |
|---|---|---|---|
| 5,572,688 | * 11/1996 | Sytwu | 710/129 |
| 5,781,747 | * 7/1998 | Smith et al. | 710/129 |
| 6,044,411 | * 3/2000 | Berglund et al. | 710/9 |

* cited by examiner

*Primary Examiner*—Rupal Dharia
(74) *Attorney, Agent, or Firm*—David J. Zwick

(57) ABSTRACT

A backplane slot configuration and a bridge card for expanding the expansion slots of one system to include the expansion slots of an adjacent electrically separate system within the same cabinet, and bridging the expansion buses with minimal change of electrical characteristics, particularly impedance, across the bridge. Adjacent end slots are spaced apart according to the relevant specification, and each slot set is configured so that the backplane expansion buses span contiguous slots and the expansion buses include the adjacent end slot.

1 Claim, 3 Drawing Sheets

SYSTEM FOR PROVIDING BRIDGING OF BACKPLANE

This application claims the benefit of U.S. Provisional Application serial number 60/101,134, filed Sep. 21, 1998.

FIELD OF THE INVENTION

The present invention relates to backplane expansion slot configurations, and more particularly to a backplane expansion slot configuration allowing for efficient bridging and extension of expansion slot buses when combining systems in a single cabinet.

BACKGROUND OF THE INVENTION

Various implementations have been made in the industry to extend the bus architecture of computer systems to additional chassis. This was first widely implemented in the early 1980's as PC expansion chassis were commercialized by IBM and others. These systems extended the processor bus by inserting a card in one processor slot of each system and then interconnecting the systems by a cabling configuration between the inserted cards. This solution was satisfactory with the relatively slow systems of the time. A more recent example is Dialogic Corporation's ScxBus extender. This implementation takes signals from a time division multiplexed bus and retransmits them over a SCSI-like cable and connector system. This system is very costly and the distance the system can be extended is limited due to timing and loss considerations. Cabling approaches such as these that connect separate chassis or slot sets in a cabinet disrupt the timing and electrical characteristics of the resultant extended bus.

A system's capabilities can also be extended by transmitting bus information to another system's bus over a LAN using protocols such as Ethernet, ATM, or other packet protocol technologies. This also is an expensive solution, and introduces relatively long delays in the bus traffic.

Another solution to expanding an existing system within a cabinet is to replace the backplane with one that has sufficient slots for the application at hand. Not only is this solution expensive, but it is labor intensive and tends to be disruptive to the system.

Accordingly, it is an object of the present invention to provide an inexpensive solution to easily extend the expansion slots and buses of a system within a cabinet while minimizing the impact to system timing and electrical characteristics.

Another object of the present invention is to extend the expansion slots and buses of a system within a cabinet without modification or replacement of the backplane.

SUMMARY OF THE INVENTION

The present invention is a slot configuration and a bridging apparatus for expanding the expansion slots of one system to include the expansion slots of an adjacent electrically separate system within the same cabinet and bridging the system buses. The cabinet configuration of the invention allows for easy bridging of the slot sets and buses with minimal change of electrical characteristics, particularly impedance, across the bridge.

Adjacent slot sets are configured to allow for the largest combined set of contiguous expansion slots and the longest bus spans, and the adjacent end slots of the slot sets are configured so that their center-to-center spacing complies with the linear topology for slot spacing of the applicable standard.

For example, in a cabinet containing two similar but separate processor systems and a single backplane bus, the slots would be configured so that the two power supplies are in the outermost slots, the processor boards occupy the next inner slots, and the expansion slots occupy the remaining innermost slots. The expanding slots would be configured so that the expansion buses span contiguous slots and the buses include the innermost end slots. The center-to-center spacing of the adjacent innermost end expansion slots for each system is equal to the center-to-center spacing of the expansion slots within each system. With the cabinet configured in this manner, the two systems are electrically separate from each other. To expand one of the systems, the CPU and expansion cards of the other system are removed from the cabinet, a double-wide bridge card is inserted across the two adjacent innermost end expansion slots, and additional expansion cards are inserted into the vacated expansion slots as required. The resulting combined system will have the longest backplane bus possible within the cabinet, and the spacing of the bridged innermost end expansion slots assures a minimal system impact from timing and impedance characteristics across the bridge.

In general, if the cabinet contains two separate processor systems with multiple backplane buses, the slots are configured in a mirrored arrangement about the center slots with respect to bus connections. The power supplies and other non-bus cards occupy the outermost cabinet slots. The remaining expansion slots are arranged so that the expansion buses span contiguous slots and the buses include the innermost end slots. In this configuration, when the PCI bridge card is inserted across the two innermost end expansion slots, all buses will be extended with the greatest uninterrupted backplane spans.

With certain complex arrangements of multiple buses, it may not be possible for all buses to have an uninterrupted span across the backplane.

DESCRIPTION OF THE DRAWINGS

FIG. 1 is a plan view of a cabinet containing two separate processor systems with slots configured according to the present invention.

FIG. 2 is a plan view of the cabinet showing the bridge of the present invention installed.

FIG. 3 is a plan view of the cabinet illustrating an example of the preferred slot configuration with respect to system buses.

DESCRIPTION OF A PREFERRED EMBODIMENT

The preferred embodiment of the present invention is a standard 19-inch cabinet containing two separate computer systems, each with a compact PCI (cPCI) backplane and an ECTF H.110 TDM bus.

FIG. 1 is a plan view showing a standard 19-inch cabinet with cPCI slots configured according to the present invention. Cabinet chassis 1001 houses the cPCI backplane and installed boards. The chassis supports cPCI cards having a 6U form factor in a standard 19-inch rack. The chassis houses two independent computer systems. System 1 uses slots 1002, 1004, 1007 and 1009–1014. System 2 uses slots 1003, 1005, 1008 and 1015–1020. Power supplies are placed on the outside of the system in slots 1002 and 1003. CPU cards are placed in the next outermost slots 1004 and 1005. Slots 1007 and 1009–1014 are expansion slots for System 1, and slots 1008 and 1015–1020 are the expansion slots for System 2.

In the preferred embodiment, the System 1 cPCI backplane bus extends across CPU slot 1004 and expansion slots 1007 and 1009–1014. Likewise, the System 2 cPCI backplane bus extends across CPU slot 1005 and expansion slots 1008 and 1015–1020. The ECTF H.110 TDM bus extends across System 1 expansion slots 1007 and 1009–1014, and System 2 expansion slots 1008 and 1015–1020. For purposes of illustration, no cards are shown in the expansion slots.

The center-to-center spacing of the System 1 and System 2 end expansion slots 1007 and 1008, respectively, will be the same as the spacing between all other expansion slots. In the preferred embodiment, cPCI standards define this spacing as 0.8 inches.

Figure 1:
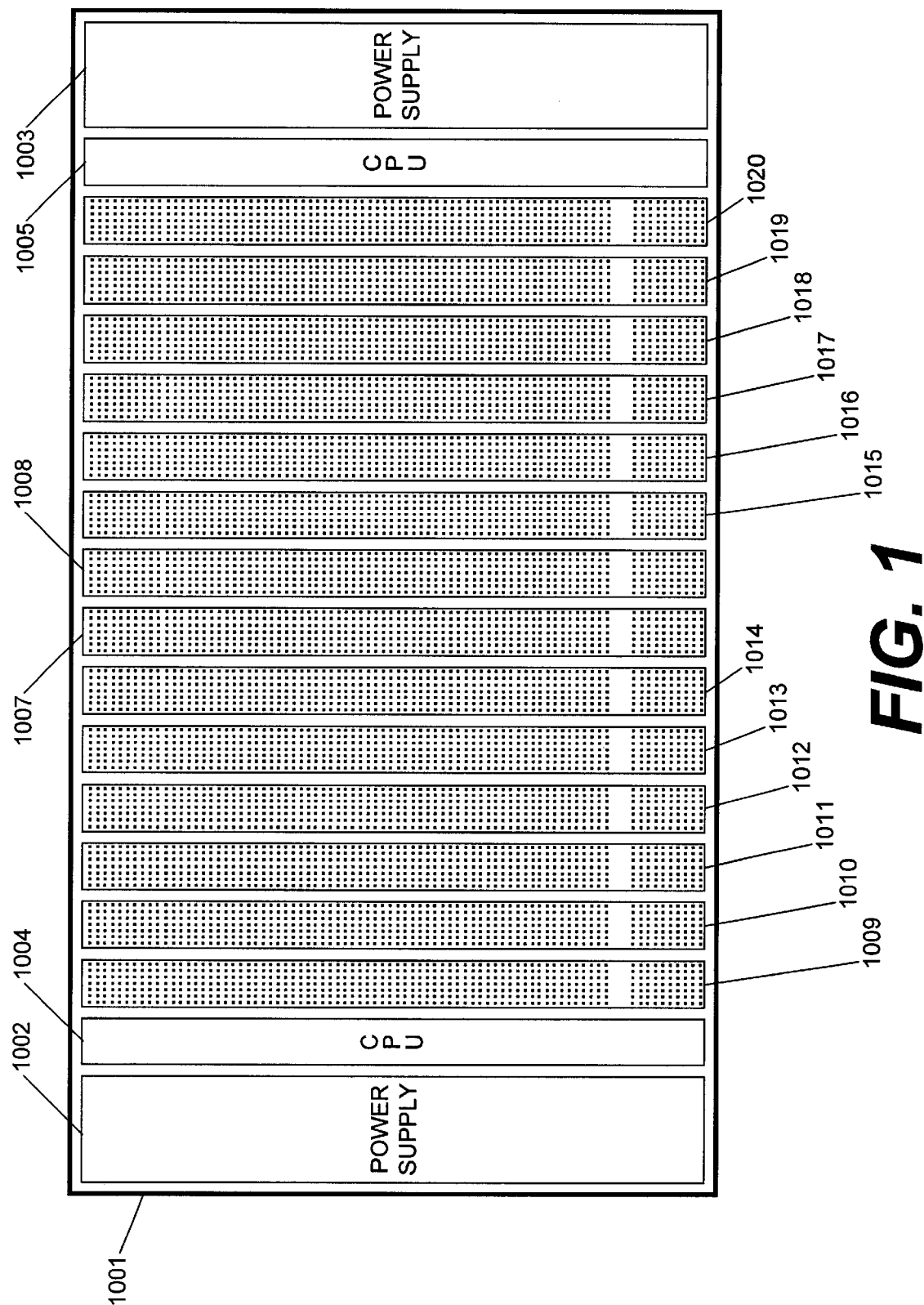
Figure 2:
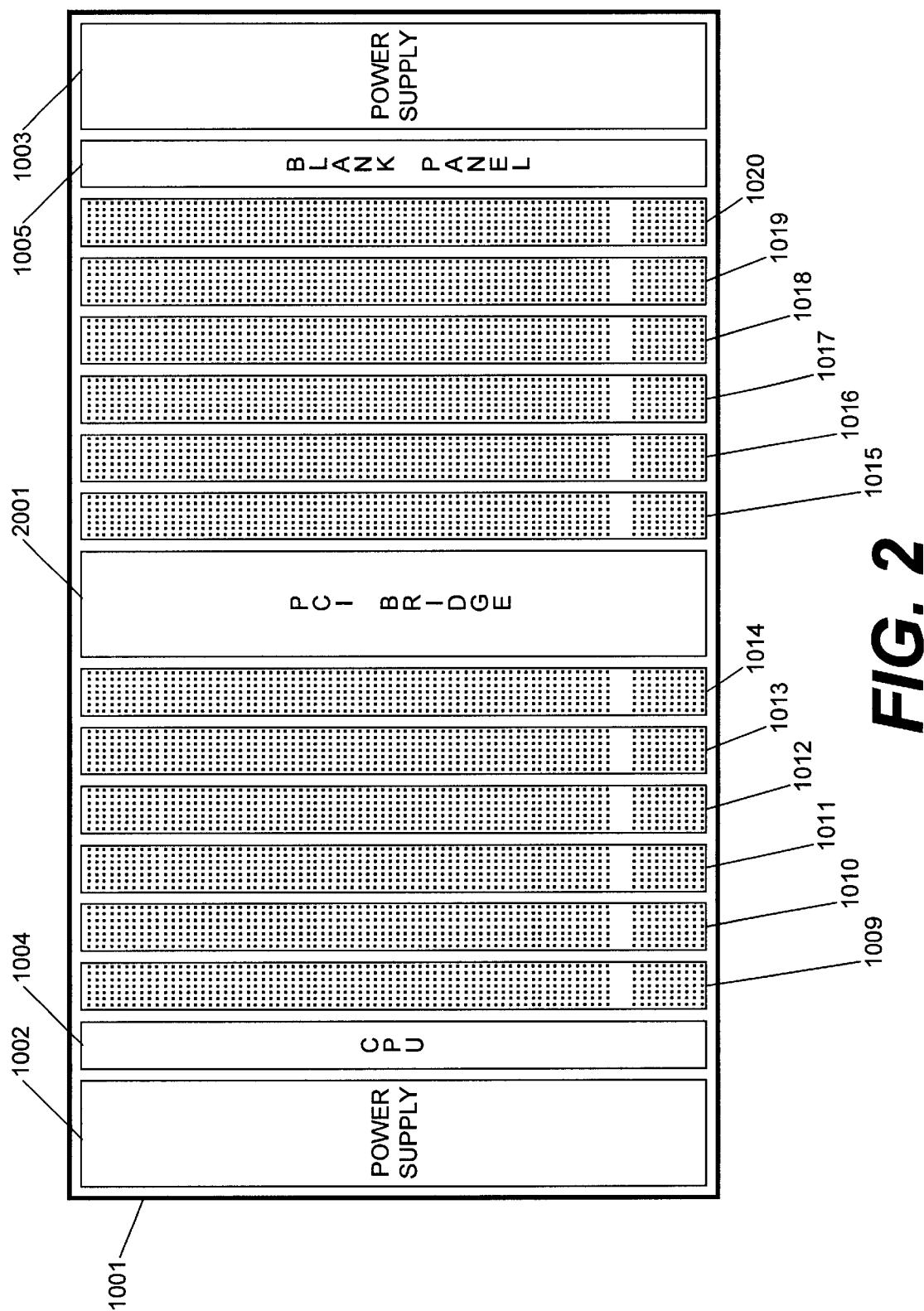

FIG. 2 shows the chassis of the present invention with PCI bridge card 2001 of the present invention installed across slots 1007 and 1008. As illustrated, the System 2 CPU card in slot 1005 as well as any other cards in System 2 expansion slots 1008 and 1015–1020 are typically removed. Any expansion card in slot 1007 and additional required System 1 expansion cards are then installed in slots 1015–1020. An expansion card may also be inserted in slot 1005 if it does not conflict with or require the use of any pins or slot keying used by the removed CPU card. The power supply in slot 1003 remains in place to provide power to expansion slots 1015–1020. In this configuration, System 1 has been expanded from seven expansion slots to 12 expansion slots.

PCI bridge card 2001 of the present invention can use any PCI bridge chip technology currently available that will satisfy system and application design requirements. In particular, PCI bridge card 2001 should be designed to minimize impacts across the bridge to electrical characteristics such as impedance.

In the configuration shown in FIG. 2, placing the power supply cards in the outermost slots 1002 and 1003 and the CPU cards in the next outermost slots 1004 and 1005 allows all backplane cPCI and H.110 bus connections for System 1, System 2 and PCI bridge 2001 to have the longest span and all appear approximately equal in terms of electrical characteristics such as impedance.

Figure 3:
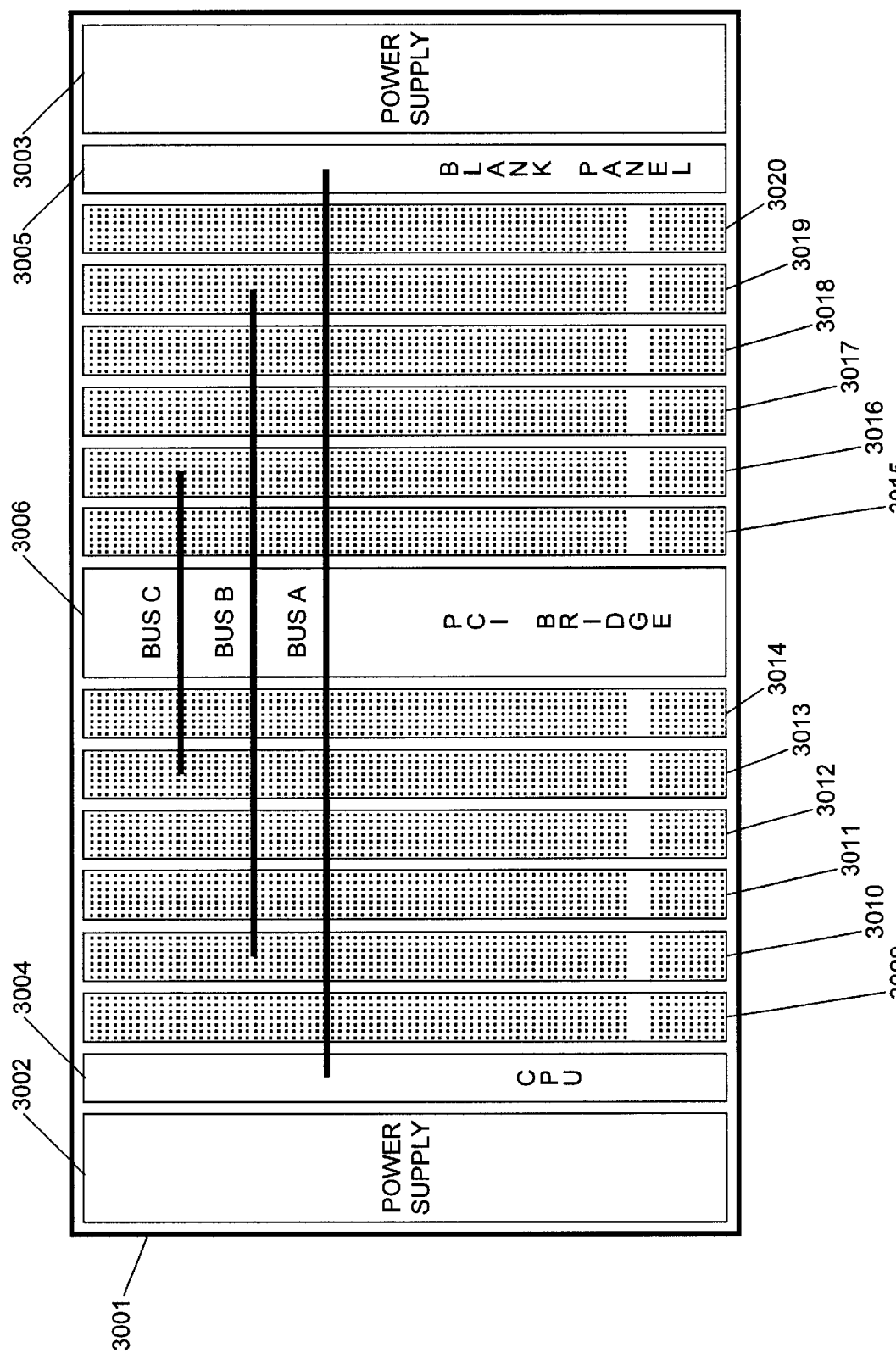

FIG. 3 shows a more general example of a cabinet chassis 3001 having cPCI slots configured according to the present invention, with PCI bridge card 3006 of the present invention installed and connecting two similar but separate systems. Each system has three backplane expansion buses logically shown as Buses A, B and C. As is shown, the configuration of the slots is mirrored about the center with respect to the expansion buses. Power supplies are located in slots 3002 and 3003. A CPU card for the bridged system is located in slot 3004, and the CPU card for the vacated system was removed from slot 3005. Remaining slots 3009–3014 and 3015–3020 are available expansion slots.

In the configuration shown in FIG. 3, PCI bridge 3006 allows the expansion slots of the two separate systems to be bridged such that Buses A, B and C all have the longest bridged spans possible in the expanded system.

OTHER EMBODIMENTS

Although particular embodiments have been described, it will be obvious to those skilled in the art that many other embodiments are possible without departing from the scope and spirit of the invention.

The optimal configuration of expansion slots, an example of which is shown in FIG. 3, is such that all backplane expansion buses span contiguous slots, all expansion buses include the innermost end slot, and buses span a minimum of three slots. Other arrangements of multiple buses may be able to take limited advantage of the invention of Applicants.

It is also possible to configure power supplies 1002 and 1003 or 3002 and 3003 to load-share both systems, or to have a single power supply for both sides of cabinet 1001 or 3001.

It would also be possible to leave both CPUs in the combined system by an additional electrical arrangement to electrically isolate the card from the PCI bus. This arrangement could provide a hot standby CPU or a symmetrical multiprocessing CPU position.

The PCI bridge could be implemented as a drawbridge chip, allowing a two CPU system in which access from buses on System 1 to buses on System 2 and access from buses on System 2 to buses on System 1 are mapped to different address ranges then where they exist on their respective local buses.

Also, although the preferred embodiment shows a backplane using the cPCI specification, any standard or proprietary specification and form factor can be employed, provided the arrangement of the slots with respect to the expansion buses is in accordance with the invention, and the center-to-center spacing of the innermost end expansion slots is in accordance with the specification used.

What is claimed is:

1. A system for combining expansion slot sets, comprising:

two sets of backplane expansion slots laterally adjacent each other, both of said slot sets in accordance with the same specification that includes slot center-to-center spacing, the adjacent end slots of said slot sets arranged in a spaced relationship to each other in accordance with said slot center-to-center spacing, said slot sets connected to one or more backplane expansion buses, each of said slots capable of supporting connections to one or more of said one or more backplane expansion buses, each of said buses connected to two or more adjacent slots within each of said slot sets, said slots in each of said slot sets in a physical arrangement such that one of said two or more adjacent slots connected to each of said buses is said adjacent end slot; and a double-wide bridge card operated to be installed across said adjacent end slots of said slot sets and bridge said expansion slot sets, said bridge further operated to minimize the impact of the bridging on the timing and electrical characteristics of bus signals transmitted across said bridge.

* * * * *